US012234161B1

(12) United States Patent
Hu et al.

(10) Patent No.: US 12,234,161 B1
(45) Date of Patent: Feb. 25, 2025

(54) KITCHEN WASTE WASTEWATER TREATMENT EQUIPMENT

(71) Applicant: Zhongcheng Institute (Beijing) Environmental Technology Co., Ltd., Beijing (CN)

(72) Inventors: Xiaoqing Hu, Beijing (CN); Tao Liu, Beijing (CN); Fengming Yue, Beijing (CN); Xingyu Zhang, Beijing (CN); Rufei Liu, Beijing (CN); Chao Ji, Beijing (CN); Feng Zhang, Beijing (CN); Liyu Liu, Beijing (CN); Zhongtao Sun, Beijing (CN); Miao Guo, Beijing (CN)

(73) Assignee: Zhongcheng Institute (Beijing) Environmental Technology Co., Ltd., Beijing (CN)

( * ) Notice: Subject to any disclaimer, the term of this patent is extended or adjusted under 35 U.S.C. 154(b) by 0 days.

(21) Appl. No.: 18/824,560

(22) Filed: Sep. 4, 2024

(51) Int. Cl.
*C02F 1/02* (2023.01)
*B01D 53/72* (2006.01)
(Continued)

(52) U.S. Cl.
CPC .............. *C02F 1/025* (2013.01); *B01D 53/72* (2013.01); *B01D 53/86* (2013.01); *B01F 27/17* (2022.01);
(Continued)

(58) Field of Classification Search
CPC .. C02F 1/02; C02F 1/025; C02F 11/00; C02F 11/10; C02F 2103/32; C02F 2201/002;
(Continued)

(56) References Cited

U.S. PATENT DOCUMENTS

2020/0087180 A1 3/2020 Wu
2022/0274850 A1 9/2022 Lillebo et al.

FOREIGN PATENT DOCUMENTS

AU 2021100796 A4 4/2021
CN 107698012 A 2/2018
(Continued)

OTHER PUBLICATIONS

English translation of Chinese Patent Application No. 114195346 A (2022).*

(Continued)

*Primary Examiner* — John Kim
(74) *Attorney, Agent, or Firm* — Westbridge IP LLC

(57) ABSTRACT

A kitchen waste wastewater treatment equipment includes a reaction kettle, a discharging mechanism and a pressurizing mechanism. In the process of high-temperature and high-pressure thermal hydrolysis of wastewater in the present disclosure, the pressurizing disk in the pressurizing mechanism continuously moves downwards in a vacuum state in the reaction kettle, reducing the volume in the reaction kettle and thus increasing the pressure. The secondary pressurization of wastewater is achieved while using heating for high-temperature and high-pressure, and the high-temperature and high-pressure environment greatly improves the reaction rate of thermal hydrolysis. The thermal hydrolysis reaction also generates gas for further pressurization, which greatly improves the treatment efficiency of wastewater. Moreover, the pressurizing mechanism and the exhaust annular groove can separate the gas generated after thermal hydrolysis.

5 Claims, 5 Drawing Sheets

(51) Int. Cl.
  *B01D 53/86* (2006.01)
  *B01F 27/17* (2022.01)
  *C02F 11/00* (2006.01)
  *C02F 11/10* (2006.01)
  *B01F 101/00* (2022.01)
  *C02F 103/32* (2006.01)

(52) U.S. Cl.
  CPC ............... *C02F 1/02* (2013.01); *C02F 11/00* (2013.01); *C02F 11/10* (2013.01); *B01F 2101/305* (2022.01); *C02F 2103/32* (2013.01); *C02F 2201/002* (2013.01)

(58) Field of Classification Search
  CPC ......... B01D 53/72; B01D 53/86; B01F 27/17; B01F 2101/305

See application file for complete search history.

(56) References Cited

FOREIGN PATENT DOCUMENTS

| | | |
|---|---|---|
| CN | 109908750 A | 6/2019 |
| CN | 111872054 A | 11/2020 |
| CN | 112759212 A | 5/2021 |
| CN | 114195346 A | 3/2022 |
| CN | 115286160 A | 11/2022 |
| CN | 217868568 U | 11/2022 |
| CN | 218079599 U | 12/2022 |
| CN | 115784482 A | 3/2023 |

OTHER PUBLICATIONS

English translation of Chinese Patent Application No. 109908750 A (2019).*

First Office Action issued in counterpart Chinese Patent Application No. 202410244479.7, dated Apr. 8, 2024.

Notification to Grant Patent Right for Invention issued in counterpart Chinese Patent Application No. 202410244479.7, dated Apr. 19, 2024.

* cited by examiner

KITCHEN WASTE WASTEWATER TREATMENT EQUIPMENT

CROSS-REFERENCE TO RELATED APPLICATIONS

This application claims priority to Chinese Patent Application No. 202410244479.7, filed on Mar. 5, 2024, the content of which is incorporated herein by reference in its entirety.

TECHNICAL FIELD

The present disclosure relates to the technical field of kitchen waste wastewater treatment, and particularly provides a kitchen waste wastewater treatment equipment.

BACKGROUND

Kitchen waste, which is classified as wet waste in urban waste classification, accounts for 50% to 60% of the total urban waste generation, mainly consisting of a mixture of unprocessed food such as fruit peels, vegetables, fish, meat, and bones. After being crushed and filtered, kitchen waste will generate a large amount of sewage containing food residues, grease, debris, organic matter, etc. Generally, solid substances such as food residues and debris are first removed by filtration equipment, and then grease is separated by oil-water separation equipment to reduce its pollution to sewers and the environment. Finally, the organic matter in the sewage is treated. Currently, the most commonly used technology for organic matter treatment is high-temperature and high-pressure thermal hydrolysis. Under high-temperature and high-pressure conditions, the organic matter (such as fats, proteins, carbohydrates, etc.) in the kitchen waste wastewater will undergo thermal hydrolysis reaction, generating gas, liquid, and solid products, which are then further separated and treated.

The high-temperature and high-pressure thermal hydrolysis technology has the following advantages. Firstly, during the thermal hydrolysis process, the generated heat can be used for power generation or other purposes, realizing energy recovery and utilization, and improving the comprehensive utilization efficiency of resources. Secondly, through thermal hydrolysis technology, kitchen waste can be converted into easily degradable organic matter, reducing dependence on traditional landfills, decreasing the amount of waste, and benefiting environmental protection. Thirdly, compared to traditional anaerobic digestion processes, thermal hydrolysis technology does not produce large amounts of malodorous gases, reducing its impact on ambient air quality. Lastly, thermal hydrolysis technology can reduce the need for chemical additives during the treatment process, lowering the concentration of chemicals in wastewater, which is conducive to subsequent wastewater treatment. These advantages make high-temperature and high-pressure thermal hydrolysis technology the most widely used sewage treatment method for kitchen waste wastewater.

However, in the process of thermal hydrolysis treatment of kitchen waste wastewater, the pressure generated during wastewater heating is used to pressurize the wastewater. The range of the pressure applied is relatively small, making it difficult to quickly carry out the thermal hydrolysis reaction of wastewater, thereby reducing the effect of kitchen waste wastewater treatment. Moreover, it is difficult to quickly separate the gas, liquid, and solid products generated after thermal hydrolysis. Secondary separation of the mixed liquid and solid products is required by external equipment, which reduces the treatment efficiency after thermal hydrolysis of wastewater.

SUMMARY

In view of the above problems, embodiments of the present disclosure provide a kitchen waste wastewater treatment equipment to solve the above technical problems.

In order to achieve the above purpose, the embodiments of the present disclosure provide the following technical solution: a kitchen waste wastewater treatment equipment, comprising a reaction kettle, wherein the reaction kettle is composed of a top cover barrel and a heating barrel fixedly connected with a bottom of the top cover barrel, a lower end of the heating barrel is arc-shaped, and the heating barrel is composed of a heating layer, a shell and a heat preservation layer filled between the heating layer and the shell.

A side wall of an upper end of the reaction kettle is provided with a liquid inlet and a vacuum pumping port, the liquid inlet and the vacuum pumping port are symmetrically arranged about an axis of the reaction kettle, a hydrolysis gas outlet is formed in a top of the reaction kettle, and a discharging outlet is formed in a bottom of the reaction kettle.

A discharging mechanism is arranged on the discharging outlet, a driving shaft concentric with the top cover barrel is rotatably connected to the top cover barrel, a pressurizing mechanism is arranged at a position, close to an upper end, of a side wall of the driving shaft, and a stirring mechanism is arranged at a position, close to a lower end.

The pressurizing mechanism includes a pressurizing disk sleeved on the driving shaft and connected to the driving shaft in a threaded fit manner, limiting grooves evenly distributed in a circumferential direction of the pressurizing disk are formed in a top of the pressurizing disk, a moving seat is slidably connected in one of the limiting grooves, a telescopic rod is hinged between the moving seat and the top of an inner wall of the reaction kettle, an exhaust ring groove is formed in an inner wall of the top cover barrel, and an auxiliary discharging group is installed at a lower end of the pressurizing disk.

The discharging mechanism includes a conical blocking cone, slidably connected in the discharging outlet in an up-down sliding manner, with its top gradually reduced in diameter upwards, a conical portion at an upper end of the blocking cone is inserted into the reaction kettle, a lower end of the blocking cone blocks the discharging outlet, an annular cylinder is installed on a lower end face of the blocking cone, filtering holes evenly distributed are formed in a side wall of the annular cylinder, and a discharging driving group for driving the blocking cone to move up and down is arranged on the discharging outlet.

In a possible embodiment, the discharging driving group includes a fixing rod fixedly connected to a middle of the discharging outlet, vertical rods symmetrically arranged in an axial direction of the fixing rod are fixedly connected to the fixing rod, a lower end of the blocking cone is provided with a spring groove, one of the vertical rods is inserted into the spring groove and is connected to the spring groove by means of a reset spring, an inclined ejector rod is rotatably connected to a middle of the fixing rod, an upper end of the ejector rod is inserted into the annular cylinder and receives the blocking cone, a guide groove is formed in an end, located below the fixing rod, of the ejector rod, a connecting shaft is slidably connected in the guide groove, a pull rod is rotatably sleeved on the connecting shaft, a supporting rod is installed at a top of the pull rod, and a top of the supporting rod is used for bearing a portion, located on an upper side of the fixing rod, of the ejector rod.

In a possible embodiment, the stirring mechanism includes scraping rods which are connected to the side wall of the lower end of the driving shaft via a fixing frame and are evenly distributed in a circumferential direction of the driving shaft, a lower end of one of the scraping rods is arc-shaped and is tightly attached to an inner wall of a lower end of the reaction kettle, and the side wall of the lower end of the driving shaft is further provided with a stirring rod arranged in a staggered manner with one of the scraping rods.

In a possible embodiment, the auxiliary discharging group includes a material pushing column connected to the lower end of the pressurizing disk via a plurality of hanging rods, the material pushing column is rotatably sleeved on the driving shaft and slides axially along the driving shaft, and a circumferential side wall of the material pushing column is composed of an outer convex arc section and an inclined section from top to bottom.

In a possible embodiment, two scraping rings arranged at equal intervals from top to bottom are installed on a lower end face of the pressurizing disk via a fixing strip, an outer ring face of the scraping ring is tightly attached to the inner wall of the reaction kettle, and a vertical section of the scraping ring is triangular.

In a possible embodiment, a vertical section of a side wall of the pressurizing disk is in a splayed shape with a small-caliber end facing the inner wall of the reaction kettle, and a vertical section of the exhaust ring groove is semicircular.

One or more of the above technical solutions in the embodiments of the present disclosure have at least one of the following beneficial effects.

Firstly, according to the kitchen waste wastewater treatment equipment designed by the present disclosure. In the process of high-temperature and high-pressure thermal hydrolysis of wastewater, the pressurizing disk in the pressurizing mechanism continuously moves downwards in a vacuum state in the reaction kettle, reducing the volume in the reaction kettle and thus increasing the pressure. The secondary pressurization of wastewater is achieved while using heating for high-temperature and high-pressure, and the high-temperature and high-pressure environment greatly improves the reaction rate of thermal hydrolysis. The thermal hydrolysis reaction also generates gas for further pressurization, which further accelerates the thermal hydrolysis speed, greatly improving the treatment efficiency of wastewater. Moreover, the pressurizing mechanism and the exhaust annular groove can separate the gas generated after thermal hydrolysis. The discharging mechanism can further separate the liquid and solid products generated after thermal hydrolysis, which not only improves the thermal hydrolysis efficiency of wastewater but also enhances the separation effect of gas, liquid, and solid products after thermal hydrolysis, achieving the effect of one machine with two functions.

Secondly, the driving shaft in the present disclosure rotates to drive one of the scraping rods, scraping off the fixed product adhered to the inner wall of the reaction kettle, so that the fixed product is prevented from adhering to the inner wall of the reaction kettle, reducing the heat transfer effect between the wastewater and the heating layer, and thus improving the thermal hydrolysis efficiency of the wastewater.

Lastly, when the discharging mechanism of the present disclosure opens the discharging outlet to discharge the liquid and solid products after thermal hydrolysis, the pressurizing disk continues to move downwards, thereby driving the material pushing column to move downwards. The material pushing column pushes liquid and solid products in the reaction kettle to be discharged downwards, the auxiliary discharging function is achieved, and the discharging speed of liquid and solid products is further increased.

BRIEF DESCRIPTION OF THE DRAWINGS

In order to more clearly illustrate the embodiments of the present disclosure or the technical solutions in the prior art, the drawings required in the description of the embodiments or the prior art are briefly described below. It is obvious that the drawings in the following description are merely embodiments of the present disclosure, and for a person of ordinary skill in the art, other drawings may be obtained according to the provided drawings without creative efforts.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

In order to enable those skilled in the art to better understand the solutions of the present disclosure, the present disclosure will be further described in detail below with reference to the accompanying drawings and specific embodiments.

Figure 1:
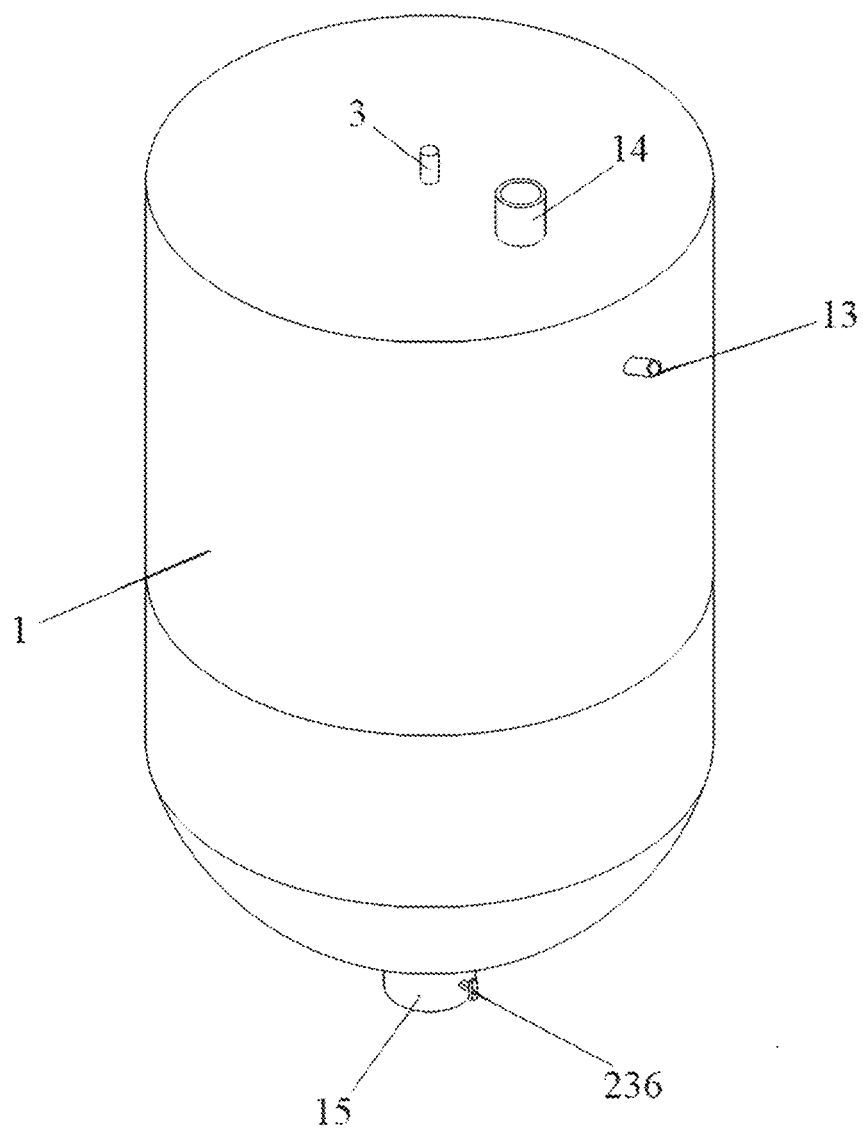
FIG. 1 is a schematic diagram of an overall three-dimensional structure of the present disclosure.
Figure 4:
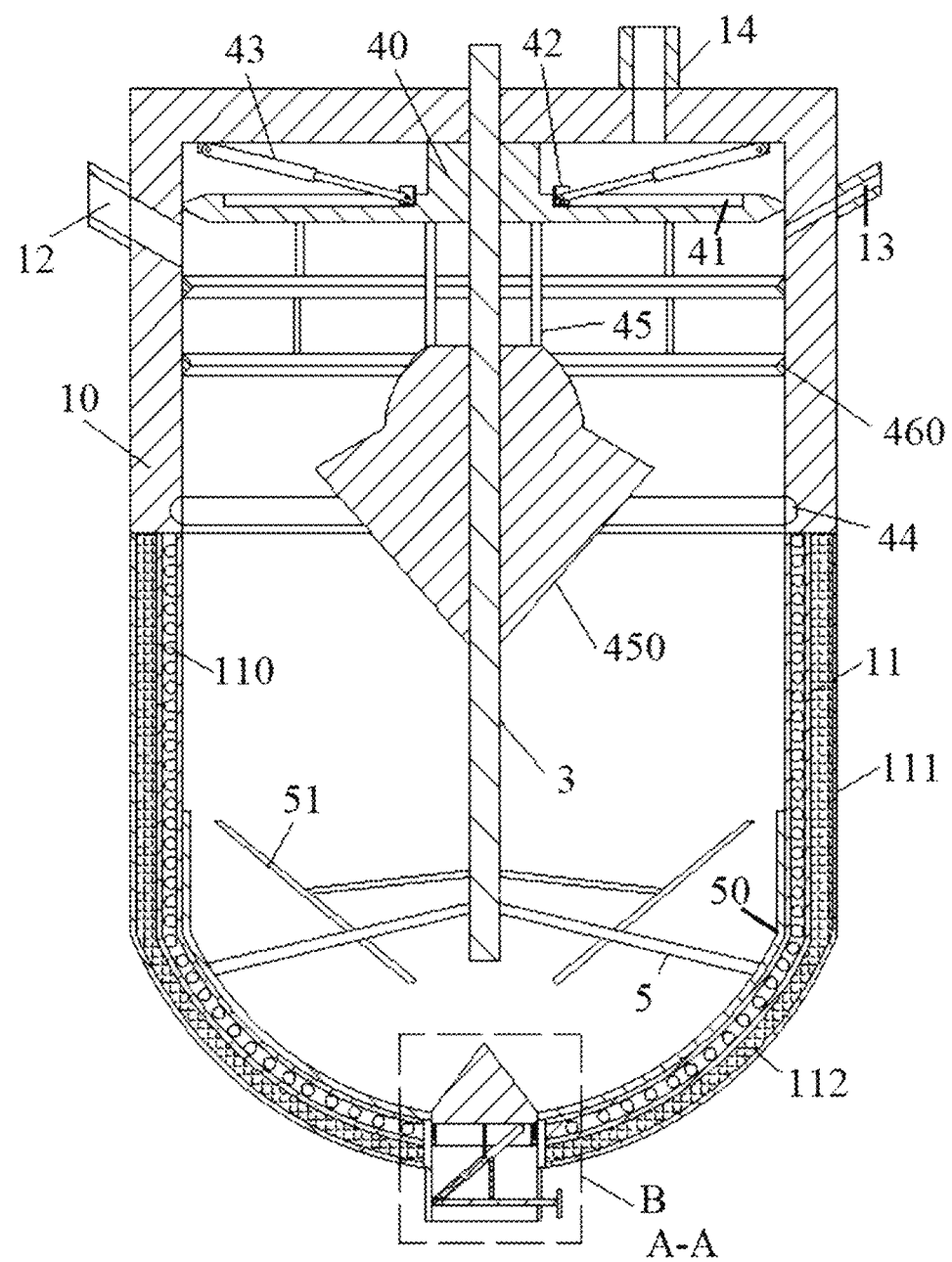
FIG. 4 is a sectional view taken along line A-A in FIG. 3.

Referring to FIG. 1 and FIG. 4, a kitchen waste wastewater treatment equipment comprises a reaction kettle 1. The reaction kettle 1 is composed of a top cover barrel 10 and a heating barrel 11 fixedly connected with a bottom of the top cover barrel 10, a lower end of the heating barrel 11 is arc-shaped, and the heating barrel 11 is composed of a heating layer 110, a shell 111 and a heat preservation layer 112 filled between the heating layer 110 and the shell 111.

Figure 3:
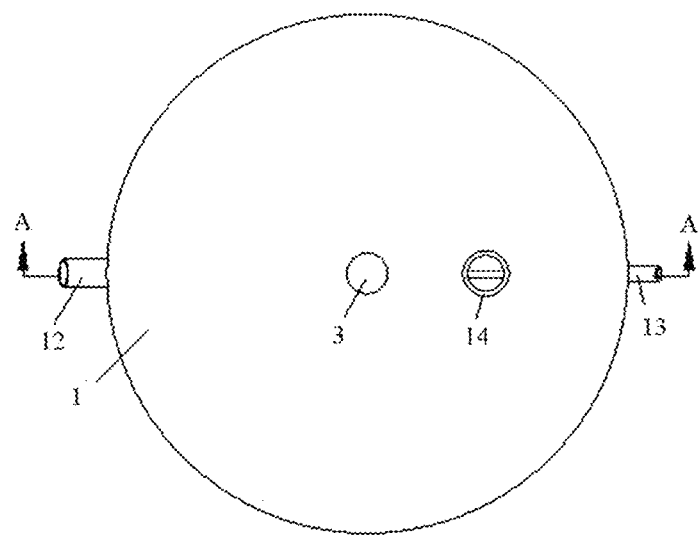
FIG. 3 is a top view of FIG. 1 of the present disclosure.

Referring to FIG. 1 and FIG. 3, a side wall of an upper end of the reaction kettle 1 is provided with a liquid inlet 12 and a vacuum pumping port 13, the liquid inlet 12 and the vacuum pumping port 13 are symmetrically arranged about an axis of the reaction kettle 1, a hydrolysis gas outlet 14 is formed in a top of the reaction kettle 1, and a discharging outlet 15 is formed in a bottom of the reaction kettle 1.

Figure 5:
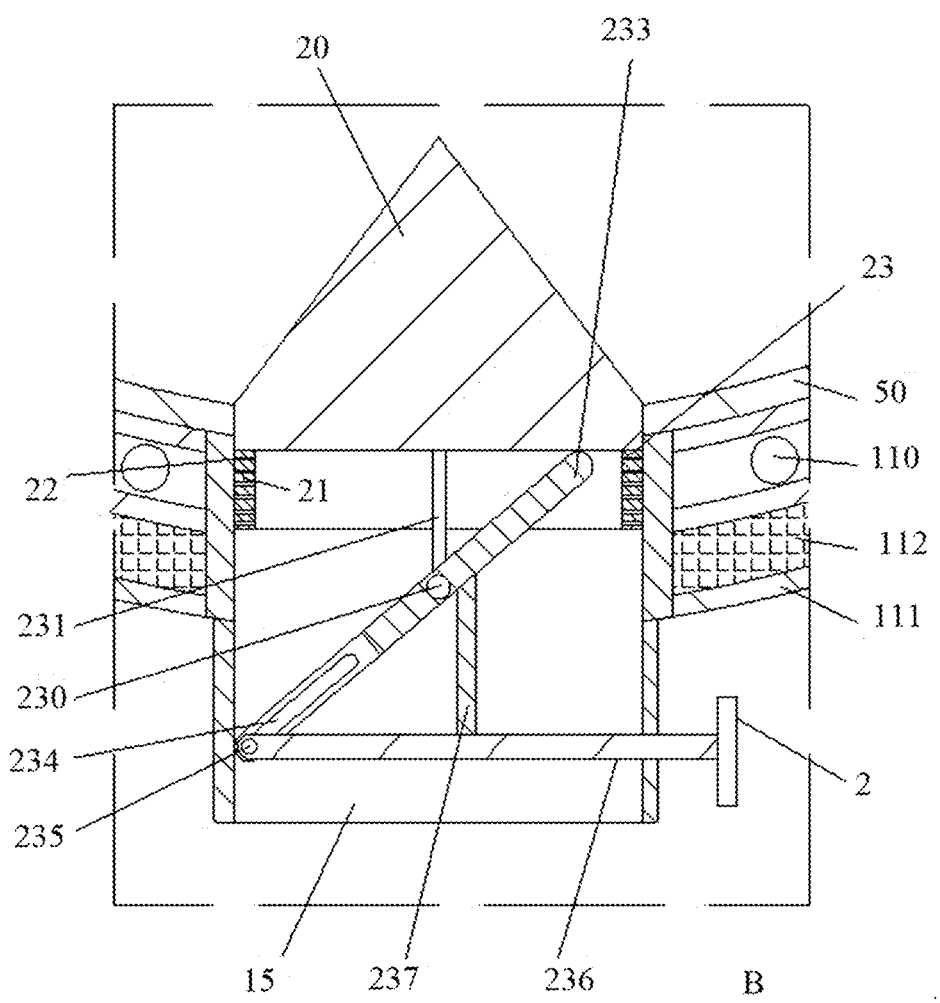
FIG. 5 is an enlarged view of part B in FIG. 4.

Referring to FIG. 1, FIG. 4 and FIG. 5, a discharging mechanism 2 is arranged on the discharging outlet 15, a driving shaft 3 concentric with the top cover barrel 10 is rotatably connected to the top cover barrel 10, a pressurizing mechanism 4 is arranged at a position, close to an upper end, of a side wall of the driving shaft 3, and a stirring mechanism 5 is arranged at a position, close to a lower end.

Figure 2:
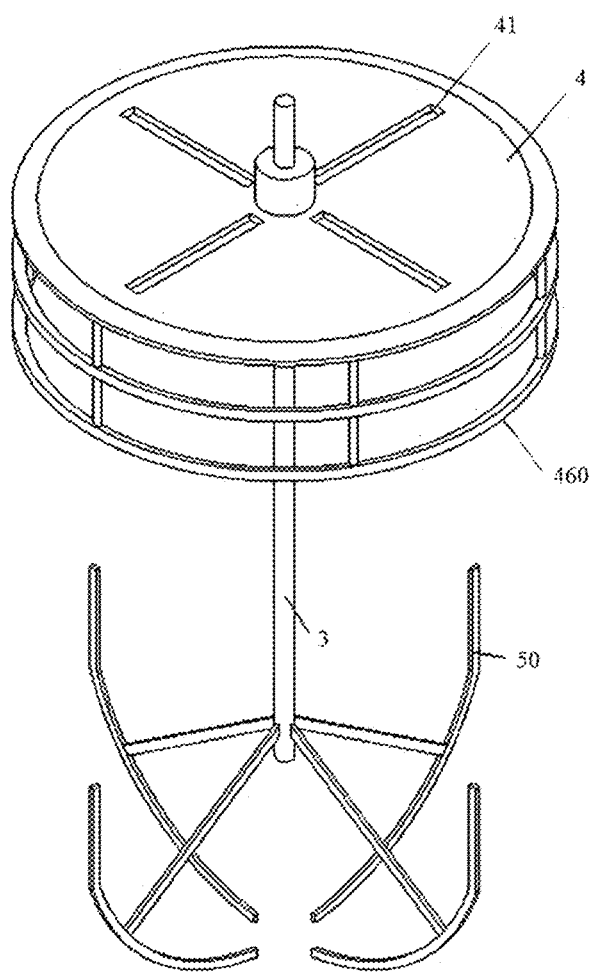
FIG. 2 is a three-dimensional structure diagram of a pressurizing mechanism and a stirring mechanism according to the present disclosure.

Referring to FIG. 2 and FIG. 4, the pressurizing mechanism 4 includes a pressurizing disk 40 sleeved on the driving shaft 3 and connected to the driving shaft 3 in a threaded fit manner, limiting grooves 41 evenly distributed in a circumferential direction of the pressurizing disk 40 are formed in a top of the pressurizing disk 40, a moving seat 42 is slidably connected in one of the limiting grooves 41, a telescopic rod 43 is hinged between the moving seat 42 and the top of an inner wall of the reaction kettle 1, an exhaust ring groove 44 is formed in an inner wall of the top cover barrel 10, and an auxiliary discharging group 45 is installed at a lower end of the pressurizing disk 40.

The wastewater is fed into the reaction kettle 1 from the liquid inlet 12. At this time, the pressurizing disk 40 blocks the hydrolysis gas outlet 14. Then, the liquid inlet 12 is blocked through existing equipment (such as a valve). Subsequently, air in the reaction kettle 1 is pumped out from the vacuum pumping port 13 through existing equipment (such as an air pump). After that, the reaction kettle 1 performs high-temperature heating on the wastewater through the heating layer 110. At this moment, the reaction kettle 1 is in a vacuum state, which can reduce the boiling point of the wastewater. This allows the wastewater to quickly reach its boiling point, boil, and generate gas. As a result, the wastewater undergoes gas-liquid separation, promoting the thermal hydrolysis reaction of the wastewater.

The driving shaft 3 is driven to rotate through an external driving source in the wastewater heating process, the driving shaft 3 is in threaded connection with the pressurizing disk 40 in the rotating process, and the telescopic rod 43 limits the rotating of the pressurizing disk 40, so that the pressurizing disk 40 moves downwards along the axis of the driving shaft 3. In the downward moving process of the pressurizing disk 40, the volume in the reaction kettle 1 is gradually reduced, thereby increasing the pressure. The secondary pressurization of wastewater is achieved while using heating for high-temperature and high-pressure, and the high-temperature and high-pressure environment greatly improves the reaction rate of thermal hydrolysis. Additionally, the thermal hydrolysis reaction generates gas, which further increases the pressure, thereby further accelerating the thermal hydrolysis speed and improving the wastewater treatment efficiency.

When the thermal hydrolysis is completed, the pressurizing disk 40 continues to move downwards until it is aligned with the exhaust annular groove 44. Gas generated by thermal decomposition moves from the exhaust annular groove 44 to the upper part of the pressurizing disk 40 and is then discharged through the hydrolysis gas outlet 14. Following this, the discharging outlet 15 is opened by the discharging mechanism 2. First, the liquid produced after thermal hydrolysis is filtered and discharged, and then the solid products generated during the process are discharged. This avoids the cumbersome step of separating the liquid and solid products in a later stage, and the discharging mechanism 2 achieves the effect of one machine with two functions.

Referring to FIG. 4, a vertical section of a side wall of the pressurizing disk 40 is in a splayed shape with a small-caliber end facing the inner wall of the reaction kettle 1, and a vertical section of the exhaust ring groove 44 is semicircular, so that wastewater is prevented from being accumulated in the exhaust ring groove 44 when entering the reaction kettle 1, and the structure of the side wall of the pressurizing disk 40 is used for reducing the thickness of the side wall of the pressurizing disk 40, so that when the side wall of the pressurizing disk 40 is aligned with the exhaust ring groove 44, gas can quickly move from the exhaust ring groove 44 to the upper part of the pressurizing disk 40 and is discharged from the hydrolysis gas outlet 14.

Referring to FIG. 2 and FIG. 4, the stirring mechanism 5 includes scraping rods 50 which are connected to the side wall of the lower end of the driving shaft 3 via a fixing frame and are evenly distributed in a circumferential direction of the driving shaft 3, a lower end of one of the scraping rods 50 is arc-shaped and is tightly attached to an inner wall of a lower end of the reaction kettle 1, and the side wall of the lower end of the driving shaft 3 is further provided with a stirring rod 51 arranged in a staggered manner with the one of the scraping rods 50.

During the thermal hydrolysis process, the driving shaft 3 drives one of the scraping rods 50 and the stirring rod 51 to rotate during the rotating process, so that the wastewater in the reaction kettle 1 is stirred, the wastewater can be uniformly heated, and the wastewater thermal hydrolysis efficiency is improved. When discharging is performed after thermal hydrolysis, the driving shaft 3 rotates to drive one of the scraping rods 50, scraping off the fixed product adhered to the inner wall of the reaction kettle 1, so that the fixed product is prevented from adhering to the inner wall of the reaction kettle 1, reducing the heat transfer effect between the wastewater and the heating layer 110, and thus improving the thermal hydrolysis efficiency of the wastewater.

Referring to FIG. 5, the discharging mechanism 2 includes a conical blocking cone 20, slidably connected in the discharging outlet 15 in an up-down sliding manner, with its top gradually reduced in diameter upwards, a conical portion at an upper end of the blocking cone 20 is inserted into the reaction kettle 1, a lower end of the blocking cone 20 blocks the discharging outlet 15, an annular cylinder 21 is installed on a lower end face of the blocking cone 20, filtering holes 22 evenly distributed are formed in a side wall of the annular cylinder 21, and a discharging driving group 23 for driving the blocking cone 20 to move up and down is arranged on the discharging outlet 15.

The conical structure of the blocking cone 20 can block wastewater, the problem that the wastewater is difficult to fully heat in the discharging outlet 15 is solved, and meanwhile solid products are prevented from being accumulated on the blocking cone 20. After the wastewater is subjected to thermal hydrolysis, the blocking cone 20 is pushed by the discharging driving group 23 to drive the annular cylinder 21 to move upwards for a certain distance, so that the annular cylinder 21 enters the reaction kettle 1, at the moment, movement is stopped, the blocking cone 20 does not block the discharging outlet 15, liquid generated after the wastewater in the reaction kettle 1 is subjected to thermal hydrolysis is discharged through the filtering holes 22, and the solid-liquid separation function is achieved. After all the liquid is discharged, the discharging driving group 23 pushes the blocking cone 20 again to drive the annular cylinder 21 to move upwards, the annular cylinder 21 is separated from the discharging outlet 15, the discharging outlet 15 is completely opened, and the fixed product in the reaction kettle 1 is discharged from the discharging outlet 15, the discharging mechanism 2 achieves the effect of opening and closing the discharging outlet 15, the function of separating the fixed product from the liquid is achieved, the effect of one machine with two functions is achieved, and the later solid-liquid separation step is reduced.

Figure 6:
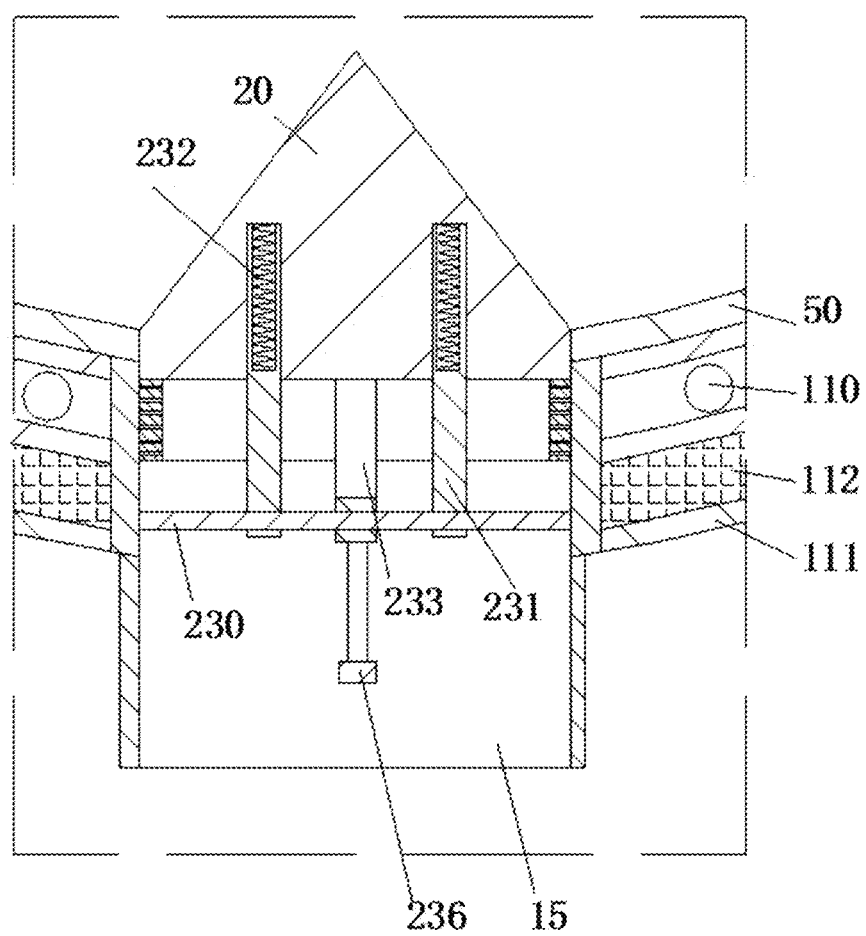
FIG. 6 is a left cross-sectional view of a discharging mechanism of the present disclosure.

Referring to FIG. 5 and FIG. 6, the discharging driving group 23 includes a fixing rod 230 fixedly connected to a middle of the discharging outlet 15, vertical rods 231 symmetrically arranged in an axial direction of the fixing rod 230 are fixedly connected to the fixing rod 230, a lower end of the blocking cone 20 is provided with a spring groove, one of the vertical rods 231 is inserted into the spring groove and is connected to the spring groove by means of a reset spring 232, an inclined ejector rod 233 is rotatably connected to a middle of the fixing rod 230, an upper end of the ejector rod 233 is inserted into the annular cylinder 21 and receives the blocking cone 20, a guide groove 234 is formed in an end, located below the fixing rod 230, of the ejector rod 233, a connecting shaft 235 is slidably connected in the guide groove 234, a pull rod 236 is rotatably sleeved on the connecting shaft 235, a supporting rod 237 is installed at a top of the pull rod 236, and a top of the supporting rod 237 is used for bearing a portion, located on an upper side of the fixing rod 230, of the ejector rod 233.

An existing gear device is installed at the bottom of the reaction kettle 1, an existing screw rod is further arranged on the reaction kettle 1 and used for locking the blocking cone 20, and the situation that the blocking cone 20 moves upwards during thermal hydrolysis is avoided. When the blocking cone 20 blocks the discharging outlet 15, the lower end of the ejector rod 233 abuts against the inner wall of the discharging outlet 15, the upper end of the ejector rod 233 abuts against the bottom of the blocking cone 20, so that the blocking cone 20 is stably supported, and the supporting rod 237, the pull rod 236 and the ejector rod 233 are arranged in a triangular shape, so that the supporting effect of the ejector rod 233 on the blocking cone 20 is further improved.

When the wastewater is subjected to thermal hydrolysis, the pull rod 236 is pulled to move towards the outside of the discharging outlet 15, the pull rod 236 drives the connecting shaft 235 to slide along the guide groove 234, the ejector rod 233 rotates under the pulling action of the pull rod 236, the top of the ejector rod 233 rotates to push the blocking cone 20 to move upwards, so that the annular cylinder 21 enters the reaction kettle 1 but is not separated from the discharging outlet 15, at the moment, the pull rod 236 is limited through existing gear equipment, and liquid is discharged from the discharging outlet 15. After all the liquid is discharged, the pull rod 236 continues to drive the ejector rod 233 to rotate, the blocking cone 20 drives the annular cylinder 21 to move upwards, the annular cylinder 21 is separated from the discharging outlet 15, the discharging outlet 15 is completely opened, and the fixed product in the reaction kettle 1 is discharged from the discharging outlet 15.

Referring to FIG. 4, the auxiliary discharging group 45 includes a material pushing column 450 connected to the lower end of the pressurizing disk 40 via a plurality of hanging rods, the material pushing column 450 is rotatably sleeved on the driving shaft 3 and slides axially along the driving shaft 3, and a circumferential side wall of the material pushing column 450 is composed of an outer convex arc section and an inclined section from top to bottom, so that materials are prevented from being accumulated on the material pushing column 450. When the discharging mechanism 2 opens the discharging outlet 15, when liquid and solid products after thermal hydrolysis are discharged, the pressurizing disk 40 continues to move downwards, thereby driving the material pushing column 450 to move downwards. The material pushing column 450 pushes liquid and solid products in the reaction kettle 1 to be discharged downwards, the auxiliary discharging function is achieved, and the discharging speed of liquid and solid products is further increased.

Referring to FIG. 2 and FIG. 4, two scraping rings 460 arranged at equal intervals from top to bottom are installed on a lower end face of the pressurizing disk 40 via a fixing strip, an outer ring face of the scraping ring 460 is tightly attached to the inner wall of the reaction kettle 1, and a vertical section of the scraping ring 460 is triangular. The scraping ring 460 scrapes the fixed product adhering to the inner wall of the reaction kettle 1 during the downward movement of the pressurizing disk 40, so that the fixed product is prevented from adhering to the inner wall of the reaction kettle 1, reducing the heat transfer effect between the wastewater and the heating layer 110, and thus improving the thermal hydrolysis efficiency of the wastewater. The scraping ring 460 cooperates with one of the scraping rods 50 to comprehensively clean the inner wall of the reaction kettle 1, and the triangular inner annular surface of the scraping ring 460 not only facilitates scraping of the solid product on the inner wall of the reaction kettle 1 via the scraping ring 460, but also avoids the problem of products accumulated on the scraping ring 460.

During operation, the wastewater is fed into the reaction kettle 1 from the liquid inlet 12, and then the air in the reaction kettle 1 is pumped out from the vacuum pumping port 13 through existing equipment (such as an air pump). After that, the reaction kettle 1 performs high-temperature heating on the wastewater through the heating layer 110, and the wastewater is subjected to a thermal hydrolysis reaction in a high-temperature pressurization state of the reaction kettle 1, so that the thermal hydrolysis reaction of the wastewater is promoted.

The driving shaft 3 is driven to rotate through an external driving source in the wastewater heating process, the driving shaft 3 is in threaded connection with the pressurizing disk 40 in the rotating process, and the telescopic rod 43 limits the rotating of the pressurizing disk 40, so that the pressurizing disk 40 moves downwards along the axis of the driving shaft 3. In the downward moving process of the pressurizing disk 40, the volume in the reaction kettle 1 is gradually reduced, thereby increasing the pressure. The secondary pressurization of wastewater is achieved while using heating for high-temperature and high-pressure, and the high-temperature and high-pressure environment greatly improves the reaction rate of thermal hydrolysis. Additionally, the thermal hydrolysis reaction generates gas, which further increases the pressure, thereby further accelerating the thermal hydrolysis speed and improving the wastewater treatment efficiency.

When the thermal hydrolysis is completed, the pressurizing disk 40 continues to move downwards until it is aligned with the exhaust annular groove 44. Gas generated by thermal decomposition moves from the exhaust annular groove 44 to the upper part of the pressurizing disk 40 and is then discharged through the hydrolysis gas outlet 14. Following this, the discharging outlet 15 is opened by the discharging mechanism 2. First, the liquid produced after thermal hydrolysis is filtered and discharged, and then the solid products generated during the process are discharged. This avoids the cumbersome step of separating the liquid and solid products in a later stage, and the discharging mechanism 2 achieves the effect of one machine with two functions.

In the description of the present disclosure, it should be understood that the orientations or positional relationships indicated by the terms "long", "width", "upper", "lower", "vertical", "horizontal", "top", "bottom", "inner", "outer", "axial", "circumferential", etc. are based on the orientations or positional relationships shown in the drawings. They are merely intended to facilitate describing the present disclosure and simplify the description, rather than indicating or implying that the device or element referred to must have a specific orientation, and is constructed and operated in a specific orientation, and therefore cannot be understood as a limitation to the present disclosure.

In the description of the present disclosure, it should be noted that, unless otherwise explicitly specified or defined, the terms "being provided with", "connected with", "installed", and "connected to" should be understood in a broad sense. For example, they can refer to fixed connections, detachable connections, or integral connections; they can be mechanical connections or electrical connections; they can be direct connections or indirect connections through intermediate media; and they can represent internal connections between two elements. For those of ordinary skill in the art, the specific meanings of the above terms in the present disclosure may be understood according to specific situations.

The embodiments of the present disclosure are all preferred embodiments of the present disclosure and are not intended to limit the scope of protection of the present disclosure, and the equivalent changes made according to the structure, shape and principle of the present disclosure shall fall within the protection scope of the present disclosure.

What is claimed is:

1. A kitchen waste wastewater treatment equipment, comprising a reaction kettle, wherein the reaction kettle comprises a top cover barrel and a heating barrel fixedly connected with a bottom of the top cover barrel, a lower end of the heating barrel is arc-shaped, and the heating barrel comprises a heating layer, a shell and a heat preservation layer filled between the heating layer and the shell;
    a side wall of an upper end of the reaction kettle is provided with a liquid inlet and a vacuum pumping port, the liquid inlet and the vacuum pumping port are symmetrically arranged about an axis of the reaction kettle, a hydrolysis gas outlet is formed in a top of the reaction kettle, and a discharging outlet is formed in a bottom of the reaction kettle;
    a discharging mechanism is arranged on the discharging outlet, a driving shaft concentric with the top cover barrel is rotatably connected to the top cover barrel, a pressurizing mechanism is arranged at a position, close to an upper end, of a side wall of the driving shaft, and a stirring mechanism is arranged at a position, close to a lower end, of the side wall of the driving shaft;
    the pressurizing mechanism comprises a pressurizing disk sleeved on the driving shaft and connected to the driving shaft in a threaded fit manner, limiting grooves evenly distributed in a circumferential direction of the pressurizing disk are formed in a top of the pressurizing disk, a moving seat is slidably connected in one of the limiting grooves, a telescopic rod is hinged between the moving seat and the top of an inner wall of the reaction kettle, an exhaust ring groove is formed in an inner wall of the top cover barrel, and an auxiliary discharging group is installed at a lower end of the pressurizing disk;
    the discharging mechanism comprises a conical blocking cone, slidably connected in the discharging outlet in an up-down sliding manner, with its top gradually reduced in diameter upwards, a conical portion at an upper end of the blocking cone is inserted into the reaction kettle, a lower end of the blocking cone blocks the discharging outlet, an annular cylinder is installed on a lower end face of the blocking cone, filtering holes evenly distributed are formed in a side wall of the annular cylinder, and a discharging driving group for driving the blocking cone to move up and down is arranged on the discharging outlet; and
    the discharging driving group comprises a fixing rod fixedly connected to a middle of the discharging outlet, vertical rods symmetrically arranged in an axial direction of the fixing rod are fixedly connected to the fixing rod, a lower end of the blocking cone is provided with a spring groove, one of the vertical rods is inserted into the spring groove and is connected to the spring groove through a reset spring, an inclined ejector rod is rotatably connected to a middle of the fixing rod, an upper end of the ejector rod is inserted into the annular cylinder and receives the blocking cone, a guide groove is formed in an end, located below the fixing rod, of the ejector rod, a connecting shaft is slidably connected in the guide groove, a pull rod is rotatably sleeved on the connecting shaft, a supporting rod is installed at a top of the pull rod, and a top of the supporting rod is used for bearing a portion, located on an upper side of the fixing rod, of the ejector rod.

2. The kitchen waste wastewater treatment equipment according to claim 1, wherein the stirring mechanism comprises scraping rods which are connected to the side wall of the lower end of the driving shaft via a fixing frame and are evenly distributed in a circumferential direction of the driving shaft, a lower end of one of the scraping rods is arc-shaped and is tightly attached to an inner wall of a lower end of the reaction kettle, and the side wall of the lower end of the driving shaft is further provided with a stirring rod arranged in a staggered manner with one of the scraping rods.

3. The kitchen waste wastewater treatment equipment according to claim 1, wherein the auxiliary discharging group comprises a material pushing column connected to the lower end of the pressurizing disk via a plurality of hanging rods, the material pushing column is rotatably sleeved on the driving shaft and slides axially along the driving shaft, and a circumferential side wall of the material pushing column comprises an outer convex arc section and an inclined section from top to bottom.

4. The kitchen waste wastewater treatment equipment according to claim 1, wherein two scraping rings arranged at equal intervals from top to bottom are installed on a lower end face of the pressurizing disk via a fixing strip, an outer ring face of the scraping ring is tightly attached to the inner wall of the reaction kettle, and a vertical section of the scraping ring is triangular.

5. The kitchen waste wastewater treatment equipment according to claim 1, wherein a vertical section of a side wall of the pressurizing disk is in a splayed shape with a small-caliber end facing the inner wall of the reaction kettle, and a vertical section of the exhaust ring groove is semicircular.

\* \* \* \* \*